3,080,156
APPARATUS FOR REDUCING METAL OXIDES WITHOUT MELTING

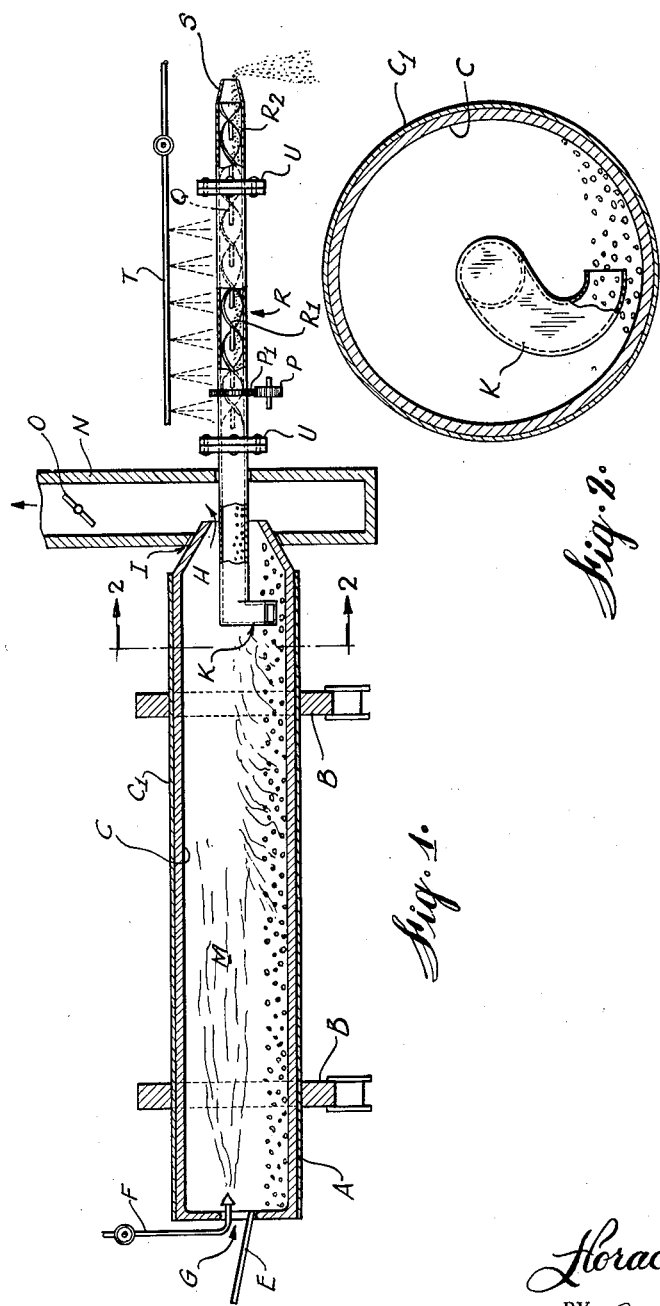

Horace Freeman, Cap de la Madeleine, Quebec, Canada, assignor to Freeman Corporation, Cap de la Madeleine, Quebec, Canada, a corporation of Quebec
Filed Mar. 23, 1960, Ser. No. 17,092
1 Claim. (Cl. 263—33)

This invention relates to the direct reduction of metal oxides, especially the oxides of iron, cobalt, nickel and copper, without melting the metal product produced.

The spongy product, formed at the temperatures required for reduction, while hot, readily recombines with oxygen from the air or from carbon dioxide from the reducing furnace, as the product is transferred from the reducing furnace to a cooling system.

In United States Patent 2,855,290, October 7, 1958, I have disclosed a method in which pellets or lumps of iron oxide are reduced to sponge iron. The pellets are mixed with a finely divided reducing agent comprising limestone or dolomite and a solid carbonaceous material capable of reducing carbon dioxide to carbon monoxide. This free flowing mixture is fed into the charging end of a slowly rotating kiln and the heat required to carry out the reduction is provided by the combustion of oil, gas or like fuel in the charging end of the kiln or reducing furnace. A suitable reducing temperature is 900 to 1050° C. The charge and combustion gases travel to the discharge end of the kiln and the metal product, still in pellet form, admixed with unused reducing agent is discharged into a cooling conveyor, while the hot gases containing unburned carbon dioxide, resulting from the reducing action in the kiln are drawn off into a chimney flue or duct so that they do not pass into the cooler conveyor.

Difficulty has been encountered in effecting the discharge of the metal product from the reducing kiln without some oxidation and reheating, since it is physically impossible to completely seal the discharge end of the rotating kiln projecting into the stationary flue or chimney. Air is drawn into the flowing mixture at this point by the draft of the chimney or by a fan used to induce gas flow through the kiln. Even momentary contact of the hot metal pellets with such air or hot flue gases burning in the air causes some oxidation and overheating of the spongy metal pellets which ignite readily. It will be observed that much combustible carbon monoxide, resulting from the reduction of the ore, is present in the gases emerging from the kiln. It has been found that the chimney or exit ducts become unduly heated when this carbon monoxide is burned upon entering the chimney. This makes prolonged and regular operation difficult to maintain, while attempting to burn a maximum amount of the gases within the kiln to utilize their heat for reducing purposes without having some reoxidation occurring in the cooler.

The present invention provides an improved apparatus for continuously removing the reduction product from the kiln and continuously feeding it into the cooler, and at the same time permitting maximum combustion of the carbon monoxide within the kiln, thereby increasing the heat efficiency of the process while preventing overheating of the chimney and/or flues.

The invention will now be described with reference to the accompanying drawing in which—

FIG. 1 is a longitudinal sectional view of the apparatus, and
FIG. 2 is a sectional view on line 2—2 of FIGURE 1.

In the drawing the kiln or reducing furnace A is a cylindrical steel shell or tube equipped with steel tires for horizontal rotation or trunnions B at about 1 r.p.m. The kiln is lined with refractory brick C and has a heat insulating cover $C_1$. A circular charging port G is provided in one end of the kiln and a discharge port H at the other end. A charging chute E and a fuel admitting device F discharge through the opening G through which air for combustion also enters. M represents the combustion flame. N is a chimney having a circular aperture I in one wall to receive the tapered discharge end of the kiln. Air is admitted to the kiln by induced draft caused by the chimney or forced or drawn in by a fan. The regulation of the draft is illustrated by the damper O.

R represents the cooling device for the reduced product and consists of a horizontally disposed metal tube mounted for rotation on trunnions, not shown, and driven by a variable speed drive, not shown, through sprocket P and gear $P_1$. The tube extends through the kiln N into the reducing furnace A. The discharge end S of the tube is tapered or conical in form. At the inner or kiln end of the tube is a scoop K for delivering the mobile mass from the kiln into the tube. The tube is cooled by water in any convenient way represented by the water spray T. As an alternative, fins may be welded to the tube for dipping into a water reservoir.

The tube R is preferably divided into three sections fastened together by flanges U. The section projecting through the chimney into the furnace is made of heat resisting steel to withstand the high temperature encountered in the furnace. The other sections may be of ordinary steel. Within the water cooled section of the tube is a helical screw conveyor $R_1$ in which the helix is welded throughout its length to the shaft Q and in the discharge end section is a section of similar helical screw conveyor welded along its outer edge to the inner wall of the tube as indicated at $R_2$.

In the illustration shown the reducing kiln is 33 feet in length and 4 feet in diameter while the cooling device is 20 feet long and 12 inches in diameter. However the dimensions may be varied to provide any desired capacity.

As will now be apparent in operation the reduced charge is transferred directly to the cooling tube by the scoop K which normally rotates with the tube R in the opposite direction to that of the kiln and it passes free from air from the reducing atmosphere of the kiln to the discharge end of the cooler. The rate of feed to the reducing kiln is controlled in accordance with the discharge outlet S of the cooling tube R to insure continuous operation. The scoop feed to the tube being directly from within the reducing chamber, air is not admitted to the mass of product to be cooled. Upon discharge of the cooled mass from the tube the metal pellets are separated from the residue.

As illustrative the charge to the kiln may be 100 parts by weight of porous ore pellets, substantially free from dust, 40 or more parts of coke passing a screen having ⅜ inch mesh and 10 or more parts of limestone or dolomite passing a ⅛ inch mesh screen. The charge is the same as that described in my prior patent.

From the description given it is clear that the present process and apparatus constitute an important improvement in both efficiency and economy of operation in the production of iron and like sponge metals.

What is claimed is:

Apparatus for reduction of metal oxides which comprises a cylindrical kiln having its axis disposed in a substantially horizontal plane, means mounting said kiln for rotation about its said axis, said kiln having a feed end and discharge end, a fuel combustion burner in said kiln adjacent said feed end, a metal tube in axial alignment with said kiln and projecting through said discharge end into said kiln, said tube having a minor section partially disposed within said kiln and a major section disposed exteriorly of said kiln, means mounting said tube for rotation about its axis, said tube mounting means being independent of said kiln mounting means for rotation of said tube and kiln in opposite directions, said tube having an inlet end disposed within said kiln adjacent said kiln discharge end, an outlet end, and a materials-receiving scoop carried by said tube inlet end, said scoop being disposed in said kiln adjacent said discharge end whereby said scoop is in remote relation to said burner, a materials-guiding helical screw fixed within said major section of said tube, means for cooling said major section of said tube, and a chimney for discharge of combustion gases from said kiln, said chimney having a side wall, said chimney side wall having two diametrically opposite openings therein, said discharge end of said kiln extending through one of said chimney side wall openings and terminating within said chimney, said minor section of said tube extending transversely of said chimney and through both of said openings, said kiln discharge end having an annular opening surrounding said tube and leading from the interior of said kiln into said chimney.

References Cited in the file of this patent

UNITED STATES PATENTS

| | | |
|---|---|---|
| 1,566,103 | Kirk | Dec. 15, 1925 |
| 1,938,832 | Hougen et al. | Dec. 12, 1933 |
| 2,348,673 | Degner | May 9, 1944 |
| 2,592,783 | Aspegren | Apr. 15, 1952 |
| 2,704,662 | Kocks | Mar. 22, 1955 |
| 2,747,988 | Von Haken | May 29, 1956 |
| 2,792,298 | Freeman | May 14, 1957 |
| 2,855,290 | Freeman | Oct. 7, 1958 |
| 2,900,236 | Speed et al. | Aug. 18, 1959 |
| 2,944,887 | Gray | July 12, 1960 |

FOREIGN PATENTS

| | | |
|---|---|---|
| 674,236 | Great Britain | June 18, 1952 |